Figure 1:
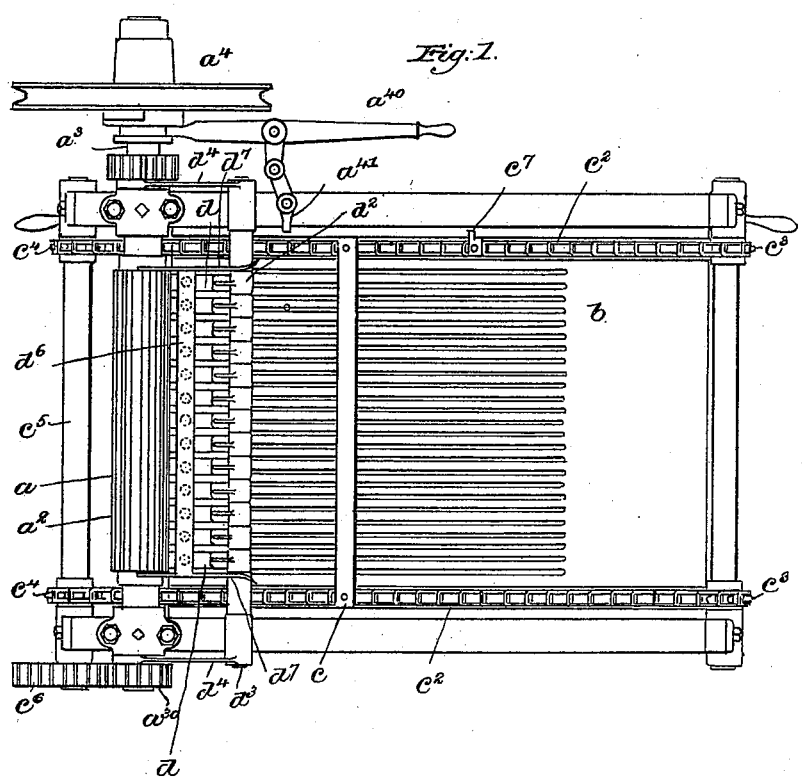

No. 651,619. Patented June 12, 1900.
J. A. TILDEN.
SUGAR CUTTING MACHINE.
(Application filed Aug. 22, 1898.)
(No Model.) 2 Sheets—Sheet 1.

Witnesses.
Inventor:
James A. Tilden
by J. P. and S. H. Livermore
attys.

No. 651,619. Patented June 12, 1900.
J. A. TILDEN.
SUGAR CUTTING MACHINE.
(Application filed Aug. 22, 1898.)
(No Model.) 2 Sheets—Sheet 2.

Witnesses
Jas. J. Maloney
Nancy P. Ford

Inventor,
James A. Tilden,
by J. P. and H. Livermore
Att'ys.

UNITED STATES PATENT OFFICE.

JAMES A. TILDEN, OF HYDE PARK, MASSACHUSETTS, ASSIGNOR TO THE HERSEY MANUFACTURING COMPANY, OF BOSTON, MASSACHUSETTS.

SUGAR-CUTTING MACHINE.

SPECIFICATION forming part of Letters Patent No. 651,619, dated June 12, 1900.

Application filed August 22, 1898. Serial No. 689,234. (No model.)

*To all whom it may concern:*

Be it known that I, JAMES A. TILDEN, of Hyde Park, county of Norfolk, and State of Massachusetts, have invented an Improvement in Sugar-Cutting Machines, of which the following description, in connection with the accompanying drawings, is a specification, like letters on the drawings representing like parts.

The present invention relates to a sugar-cutting machine, and is embodied in a machine adapted to cut slabs of sugar, the machine being especially adapted to cut a number of bars of sugar at the same time—as, for example, the product of a sugar-forming machine adapted to compress a mass of sugar and divide the same longitudinally.

The invention is shown as embodied in a machine provided with a pair of rotary cutters, each comprising a substantially-cylindrical body portion, with blades extending longitudinally along its surface, and the sugar is acted upon by a suitable feeding device which moves the same toward and between the said cutters, so that the sugar acted upon is cut into small lengths. The cutter-blades of one cutter do not meet those of the other, but are separated therefrom, so that the blades do not come together in the cutting operation, but simply act upon the opposite sides of the sugar to make a slight incision, with the effect, however, that the piece is completely severed, being fractured through the middle beyond the cut portions. The said cutters are so arranged that the peripheral velocity thereof is greater than the velocity of the feed movement imparted to the sugar, the result being that the blades practically strike a chopping blow at opposite sides of the sugar, thus completely severing the sugar without any tendency to jam the sugar and fill the space between the blades. The blades on each cutter therefore are separated a distance greater than the length of the section which is to be separated from the rest, so that the said section does not fill the space between the blades, and therefore has no tendency to wedge in between the same.

In accordance with the invention the feed movement of the sugar, the speed of which is less than the peripheral velocity of the cutters, as has been stated, is controlled by means adapted to retard the feed movement sufficiently to prevent the sugar from being dragged along by the cutters away from the feeding device and also to properly position the sugar with relation to the cutters, the said means being also arranged to conform to irregularities in the surfaces of the sugar which are presented to the cutters, so as to operate under all conditions without interrupting the operation or damaging the machine. The sugar is fed to the cutters from a suitable support, the edge of which is adjacent to the lower cutter and substantially tangential thereto, the projecting end of the support being preferably in the form of a somewhat-yielding spring. To maintain the sugar upon the said support, the surface of said sugar opposite the surface which lies on the support is arranged to be acted upon by the feed-controlling device, which consists of a yielding finger adapted to be pressed toward the surface of the sugar with sufficient force to keep the same snugly against the support and to sufficiently retard the feed movement thereof. To compensate for irregularities in the surface of the sugar and at the same time to insure the proper guidance of the sugar toward the knife-blades, the said yielding finger is arranged tangential to the cutter toward which it projects and is so supported that the end which is first engaged by the sugar is capable of movement on the arc of a circle struck from the axis of the cutter, so that a piece of sugar thicker than the normal is free to move the said rear end without injury to the machine, while the yielding finger still tends to guide it properly toward the cutter-blades. The opposite end of said finger is also capable of yielding when engaged by the surface of the sugar, the movement in this case being substantially on the arc of a circle struck from the end of the finger which was first engaged by the sugar.

When the machine is to operate upon a number of bars of sugar simultaneously, it may be provided, as shown, with a number of feed-controlling fingers, (one for each bar,) there being a spring extension from the support for the sugar corresponding to each finger. The said fingers may be pivotally supported at the end which is first engaged by the sugar upon a suitable frame extending across the machine parallel to the cutters, the said frame in turn having supporting arms or brackets pivoted upon or pivoted coaxially with the axis of the cutter. Each finger in this case is pivoted independently of the others, and the supporting-frame for the said fingers is somewhat flexible, so that each bar of sugar is practically independently guided toward the cutters and properly acted upon thereby.

The bars of sugar are preferably arranged upon supporting-plates before being fed to the machine, and the said supporting-plates are placed upon a suitable bed in such position that the bars of sugar thereon will be engaged by the traveling feed member which travels across the said bed and between the rolls, thus forcing the bars forward at a proper rate of speed and overcoming the tension of the spring-fingers, which tension, however, as has been stated, is sufficient to overcome the tendency of the cutters to drag the sugar forward faster than the movement of the feeding device.

The machine is especially adapted for use in conjunction with sugar formed by means of a machine which is the subject of another application filed by me herewith, from which machine the sugar is delivered after being formed in bars upon plates, which bars, still retained on the plates, are subjected to heat until dried and hardened prior to the cutting operation.

Figure 2:
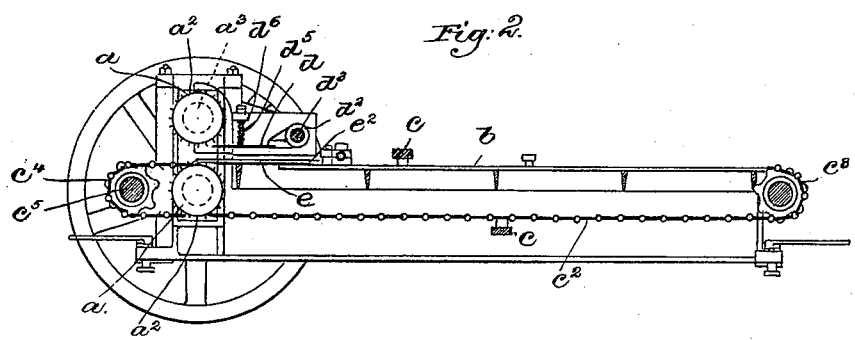
Figure 3:
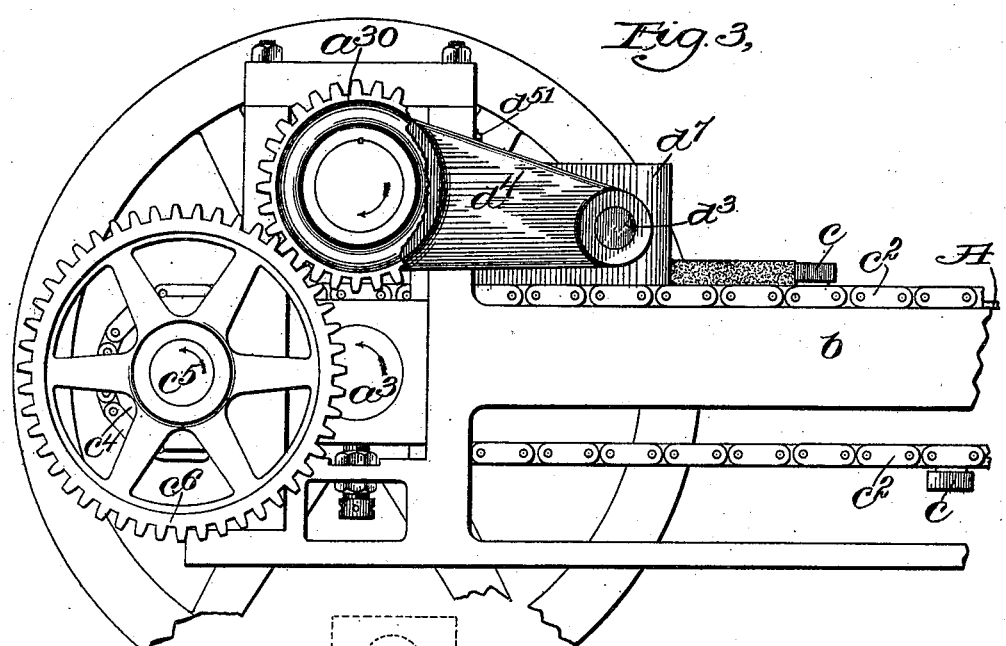
Figure 4:
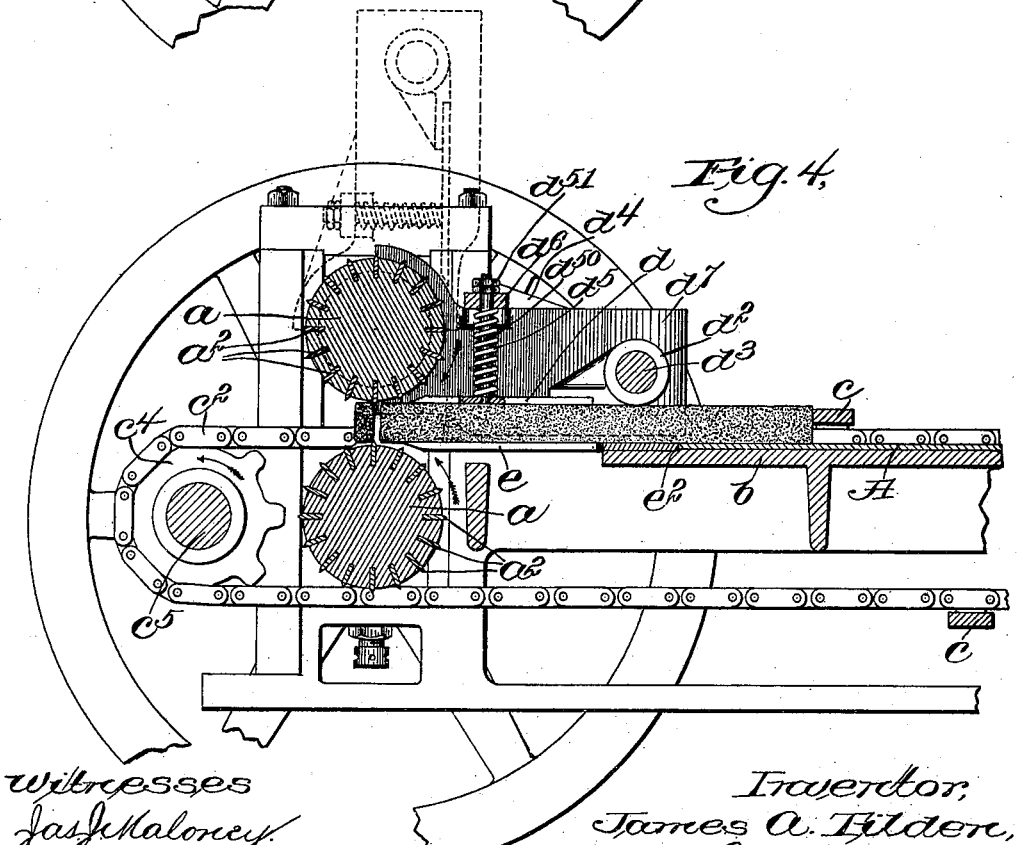

Figure 1 is a top plan view of a machine embodying the invention. Fig. 2 is a vertical longitudinal section of the same; and Figs. 3 and 4 are respectively a side elevation and a longitudinal section of the cutter end of the machine on an enlarged scale.

The machine embodying the invention is provided with rotary cutters $a$, each provided with a number of longitudinal blades $a^2$, the said cutters being geared together and shown as operated by a shaft $a^3$, which is adapted to be started and stopped by means of a clutch $a^4$ of any suitable or usual kind. The said cutters are arranged to receive the sugar from a table or bed $b$ upon which the sugar is supported, with the bars in parallel lines transverse to the cutter-rolls $a$. The bars of sugar are preferably arranged on thin plates or supports A before being fed to the machine, and the said plates are placed upon the table $b$, so that a number of bars of sugar are fed to the machine at one time, the said bars being acted upon by a feeding device $c$, herein shown as a cross member extending transversely across the table and arranged to be moved along the surface of the same by means of chains $c^2$, traveling over sprockets $c^3$ and $c^4$, the latter sprockets being mounted on a shaft $c^5$, driven by a spur-gear $c^6$, meshing with the gear $a^{30}$ on the shaft which carries the upper cutter $a$. After a plate containing a number of bars of sugar has been placed in position the machine is started by operating the clutch $a^4$, as by a handle $a^{40}$, the cross member $c$ or feeding device then traveling along the surface of the plate which is supported on the table $b$ and engaging the ends of the sugar bars and moving all of said bars longitudinally toward and between the cutter-rolls $a$, which are arranged to rotate at a peripheral speed greater than the speed of the feeding device, (the gear $a^{30}$ being smaller than the gear $c^6$,) so that each cutter-blade makes a slight incision in the surface of the sugar, at the same time acting to break or fracture the body of the sugar, so as to divide the bars into lumps of substantially-equal size. To compensate for the difference in speed above mentioned, the distance between the cutter-blades is greater than the length of the lumps which are to be cut.

To control the feed movement of the bars as the said bars approach the cutters, so as to prevent the said bars from being dragged along by the action of the blades faster than the predetermined rate of speed, the machine is shown as provided with one or more fingers $d$, the said fingers $d$ being shown as secured to supporting hubs or sockets $d^2$, mounted on a cross-bar $d^3$, supported by arms or brackets $d^4$, which are shown as pivoted coaxially with the upper cutter-shaft or its bearing. By this construction it is obvious that if a portion of the slab or bar of sugar is of abnormal thickness it will, as it is moved along by the feeding device, lift that end of the finger $d$ which it first engages—viz., the hub end thereof—and pass under the same without being unduly retarded. This lifting of the rear end does not alter the tangential relation of the finger $d$ to the upper cutter, so that the tendency is to guide the sugar in the proper direction, the end of the finger near the cutter, however, being also yieldingly supported in order to prevent the sugar from binding. As herein shown, the finger $d$ is acted upon by a spring $d^5$, interposed between the said finger and a cross-bar $d^6$, which is secured at its ends to guides $d^7$, the said guides serving to laterally confine the sugar.

In the present construction, in which the machine is especially adapted to operate upon previously-prepared bars of sugar, there are a number of fingers $d$, (one for each bar,) each one being substantially independent of all the others in its yielding action. The frame which supports the said fingers is quite flexible, owing to its construction and manner of support, so that in the operation of the machine the several fingers play up and down, each properly guiding its own bar of sugar independently of the action of the others.

It is obvious that the construction described might be duplicated at the opposite surface of the sugar; but this is not essential, it being preferable, therefore, for the sake of simplicity to provide the support for the sugar with projecting fingers $e$ in the form of flat springs capable of yielding, if necessary, the said fingers $e$ being tangential to the lower cutter. It will be seen that if one of the fingers $d$ is raised at its rear end by a bar of sugar of abnormal thickness the tendency will be to transmit the pressure from the finger $d$ to the spring $e$, so that the strain is practically divided between the finger and spring and the bar properly centered between the cutters. The supporting-frame for the fingers merely rests on the bed of the machine and is bodily lifted when a portion of a bar of sugar thicker than normal engages one of the fingers. The weight of the frame is such as to afford the desired tension, and the frame is so constructed as to be somewhat flexible, so that the slight lift of a part of the frame caused by any one bar of sugar will not materially relieve the tension on the other bars.

The spring-fingers $e$ are shown as rigidly secured at one end to the bed of the machine, projecting therefrom toward the cutters, and the rear ends of said springs afford shoulders or projections $e^2$, which serve as a gage to determine the position of the plates A, containing the sugar, when the said plates are placed in the machine. When the machine is started, therefore, the feed member, which is separated from the bed a sufficient distance to clear the plate A and the springs $e$, engages the rear ends of the bars, sliding the said bars forward off the plate upon the springs $e$, which coöperate with the fingers $d$ to retard the bars and control the feed movement thereof, as described, the said springs $e$ and their mates $d$ being of sufficient length to afford a somewhat-flexible holding device for the bars, which are thus centered by the action of the cutters themselves.

The fingers $d$ may be independently adjustable with relation to their supporting-frame, each finger being shown as positioned by means of a stem $d^{50}$, extending upward through the cross member $d^6$ and through the spring $d^5$, the said stem being acted upon by nuts $d^{51}$, which serve to adjust the finger. The supporting-frame for the fingers can, as indicated in dotted lines, Fig. 4, be bodily swung upward on its axis, thereby rendering the cutters and the fingers easily accessible for cleaning or repairs.

It is desirable that the machine should stop at the end of each run, since the plates containing the bars of sugar need to be carefully positioned prior to the operation of the machine, and for this purpose the clutch $a^4$ is shown as provided with an operating-lever $a^{41}$, arranged to be engaged by a projection $c^7$, secured to one of the chains $c^2$, so that at a predetermined position of said chains the clutch is automatically operated to stop the machine.

I claim—

1. A sugar-cutting machine comprising a pair of rotary cutters; a support for a plate containing one or more bars of sugar; means for moving the said bars endwise along said support toward and between said cutters; and one or more spring-supports projecting beyond the plate-support, the said spring-supports constituting a gage or stop for said plate, as set forth.

2. A sugar-cutting machine comprising a pair of rotary cutters, a support for a number of bars of sugar, means for moving said bars endwise along said support toward and between said cutters, yielding fingers extending longitudinally over said support to engage said bars, there being one finger for each bar, and a separate adjusting device for each finger, as set forth.

3. In a sugar-cutting machine, the combination with a bed or support adapted to receive a plate containing a number of bars of sugar; a feed member extending transversely across the said bed and adapted to engage the ends of said bars, said feed member being somewhat above the bed to clear the plates; a pair of cutter-rolls mounted beyond the end of said bed and adapted to receive the said bars of sugar between them; and yielding fingers one for each bar projecting beyond said bed toward said cutter-rolls, each finger being capable of yielding at either end independently of its opposite end, as set forth.

4. In a sugar-cutting machine, the combination with a pair of rotary cutters, each provided with blades, the blades of one cutter extending toward those of the other but not meeting the same; means for rotating said cutters; a support for a plate which contains the sugar to be cut; a feeding device for the said sugar adapted to advance the same at a speed less than the peripheral speed of said cutters; and means for automatically stopping the machine after all the sugar on a single plate has been cut, as set forth.

5. In a sugar-cutting machine, the combination with a pair of rotary cutters; means for rotating said cutters; a feeding device to push the sugar forward at a speed less than the speed of the cutters; means for retarding the sugar to prevent it from being drawn away from the feeding device by the action of the cutters; and devices whereby said retarding means are caused to conform to irregularities in the surface of the sugar, as set forth.

6. In a sugar-cutting machine, a rotary cutter; means for feeding the sugar thereto; a support for the sugar; a finger adapted to bear on the sugar and maintain it in engagement with said support, the end of said finger which is first engaged by the sugar being capable of movement away from said support, said movement being suitably retarded; and means for yieldingly pressing the opposite end of said finger toward the sugar, as set forth.

7. In a sugar-cutting machine, a pair of rotary cutters; means for feeding bars of sugar between said cutters; and a feed-controlling device comprising one or more yielding fingers to engage the surface of the sugar, and a support for the said fingers behind the cutters in the direction of feed movement of the sugar and mounted on arms pivoted coaxially with the cutter whereby the rear end of said spring-finger is free to yield in conforming to irregularities of the surface of the sugar while the finger as a whole remains tangential to the cutter, as set forth.

8. The combination with the cutters; of a feeding device for moving the sugar toward said cutters; and a feed-controlling device comprising one or more fingers pivotally mounted on a flexible frame behind the cutters in the direction of feed movement, said frame being pivotally supported coaxially with the upper cutter and normally resting on the bed of the machine, as set forth.

9. In a machine for cutting bars of sugar into lumps, the combination with a pair of rotary cutters; of a supporting-bed for the bars of sugar; means for moving the said bars longitudinally along said bed toward and between the cutters; and a feed-controlling device comprising a finger to engage each bar of sugar; a flexible supporting-frame for said fingers, the said fingers being pivotally connected at one end with said frame and yieldingly connected therewith at the other end, the said frame normally resting upon the bed or support for the sugar and being capable of being lifted away from said support when engaged by a bar of sugar of abnormal thickness, substantially as described.

In testimony whereof I have signed my name to this specification in the presence of two subscribing witnesses.

JAMES A. TILDEN.

Witnesses:
H. J. LIVERMORE,
NANCY P. FORD.